Aug. 13, 1968  R. W. GIEGERICH  3,396,556
FLEXIBLE COUPLING
Filed Sept. 6, 1966  2 Sheets-Sheet 2
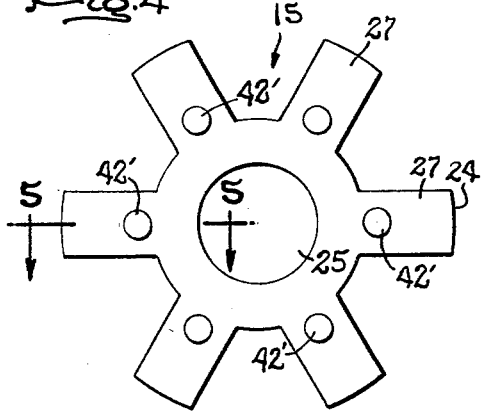
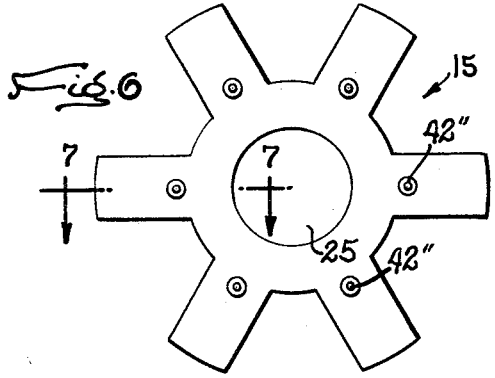
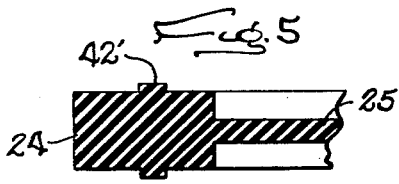
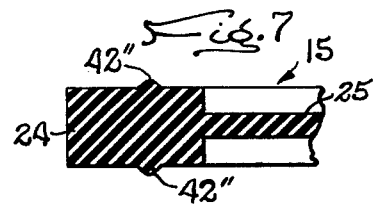
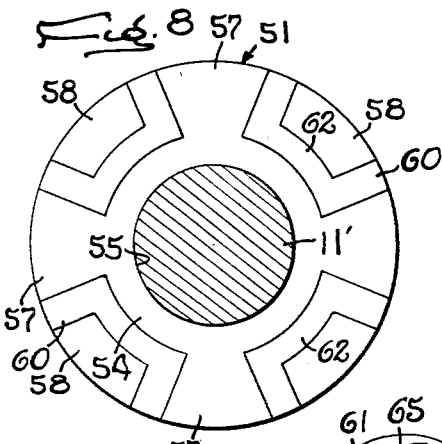
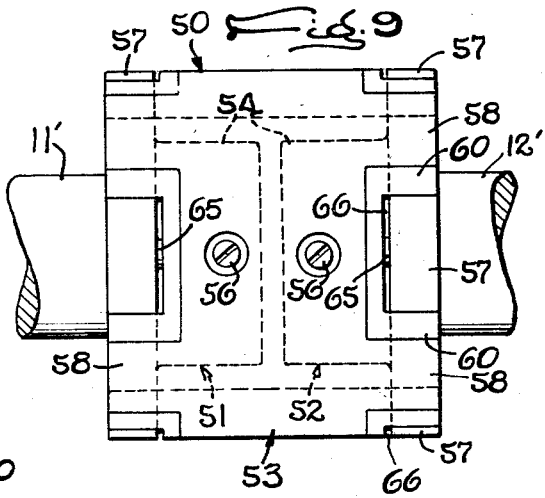
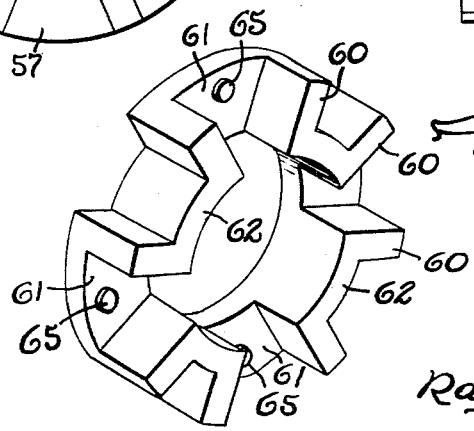
INVENTOR
Raymond W. Giegerich
by Wolfe, Hubbard, Voit & Osann
ATTORNEY United States Patent Office
3,396,556
Patented Aug. 13, 1968

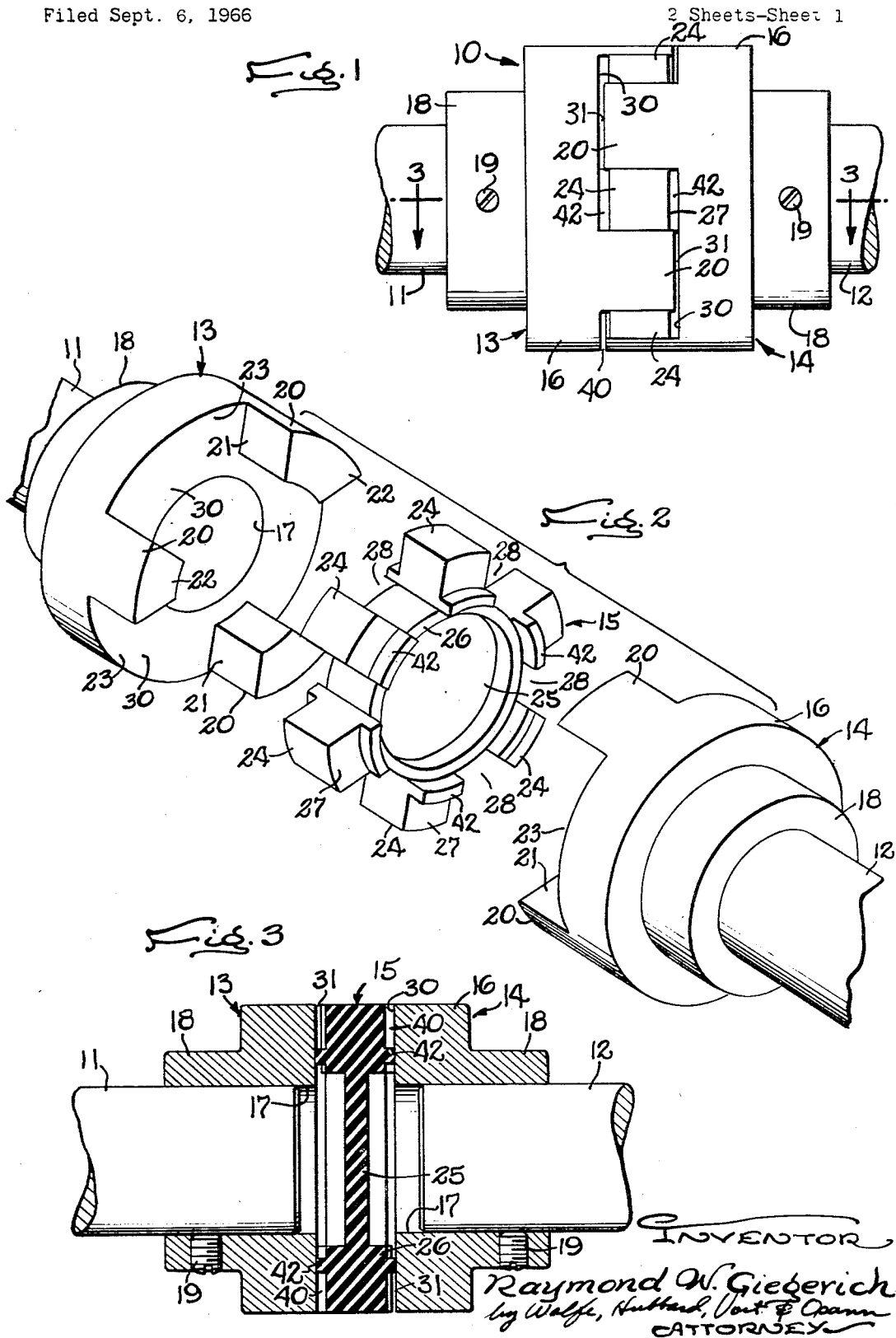

3,396,556
FLEXIBLE COUPLING
Raymond W. Giegerich, South Haven, Mich., assignor to Lovejoy Flexible Coupling Company, Chicago, Ill., a corporation of Illinois
Filed Sept. 6, 1966, Ser. No. 577,482
3 Claims. (Cl. 64—14)

ABSTRACT OF THE DISCLOSURE

A laterally and torsionally flexible coupling for connecting two shafts includes two coupling heads drivingly connected by an intermediate resiliently yieldable spider formed with lugs intermeshing with jaws on the respective heads. Compressible spacers projecting axially from the spider engage either one or both heads to establish gaps between the spider and the heads and to reduce and thrust applied to the coupling as a result of bulging of the spider.

---

This invention relates to a laterally and torsionally flexible coupling for drivingly connecting two shafts disposed in end-to-end relation, and transmitting torque between the shafts while cushioning torsional vibration and accommodating lateral misalinement of the shafts. More particularly, the invention relates to the type of coupling in which two heads are mounted on the adjacent end portions of the shafts and are connected by an intermediate resiliently yieldable spider formed with lugs around its periphery intermeshing with jaws on the respective heads. In such a coupling, it is desirable to have a small amount of axial clearance between the heads and the spider and to establish gaps between the ends of the opposed jaws on the heads thereby to avoid endwise knocking of the heads and to enable the heads to accommodate misalinement of the shafts. In addition, such clearance is desirable to avoid the exertion of endwise thrust on the heads otherwise resulting from axial bulging of the spider lugs during rotation of the coupling.

The general object of the present invention is to provide an improved coupling of the foregoing character in which the clearance between the heads and the spider and the gaps between ends of the head jaws are established at optimum values automatically as an incident to coupling the heads and without need of manual adjustment to obtain the proper spacing.

A related object is to facilitate such rapid and automatic coupling of the heads and, at the same time, to avoid the exertion of excessive endwise thrust on the heads and the shafts.

A further object is to prevent improper coupling of the heads and to do away with the need for the performance of discretionary acts by the installer of the coupling.

A more detailed object is to use resiliently compressible spacers projecting axially from the spider and engaging the heads to establish optimum clearances and to absorb end thrust resulting from bulging of the spider.

Other objects and advantages will become from the following detailed description taken in connection with the accompanying drawings, in which:

FIGURE 1 is a fragmentary side elevational view showing one form of a coupling embodying the novel features of the present invention and mounted on two shafts.

FIG. 2 is an exploded fragmentary perspective view of the coupling shown in FIG. 1.

FIG. 3 is a fragmentary cross-section taken substantially along the line 3—3 of FIG. 1.

FIG. 4 is an end view of a spider having spacers of a different type.

FIG. 5 is a fragmentary cross-section taken substantially along the line 5—5 of FIG. 4.

FIG. 6 is an end view of a spider having still another type of spacers.

FIG. 7 is a fragmentary cross-section taken substantially along the line 7—7 of FIG. 6.

FIG. 8 is an end view of a modified form of a coupling embodying the features of the invention.

FIG. 9 is a fragmentary side elevation of the coupling shown in FIG. 8.

FIG. 10 is a perspective view of the novel spider used in the coupling shown in FIG. 8.

As shown in the drawings for purposes of illustration, the invention is embodied in a coupling 10 drivingly connecting two end-to-end shafts 11 and 12 to transmit torque between the shafts while being capable of flexing both torsionally and laterally to accommodate relative rotation and angular and parallel misalinement of the connected shafts. For example, the shaft 11 may be power rotated by a suitable actuator (not shown) to rotate the shaft 12 and a driven device connected thereto.

Such couplings comprise generally a pair of heads 13 and 14 mountable on the adjacent end portions of the shafts 11 and 12 for rotation with the shafts, and an intermediate spider 15 sandwiched between the heads and yieldably connecting the heads to one another. Each head is capable of tilting slightly with respect to the other head to accommodate lateral displacement of the ends of the shafts relative to each other, and is also capable of limited rotation relative to the other head through the intermediary of the spider to cushion torsional shocks produced by abrupt speed changes and to damp torsional vibration that otherwise would be transmitted through the coupling from one shaft to another.

As shown in FIGS. 1 to 3, each head 13, 14 includes a hollow cylindrical sleeve 16 having a center bore 17 sized to telescope over the associated shaft 11, 12 with a close sliding fit and being formed integrally with a hub 18 secured to the shaft by a set screw 19. Each head is formed with three equally spaced jaws 20 integral with the sleeve and projecting axially toward the other head, the working faces 21 of the jaws being disposed in generally axial planes and the end faces 22 of the jaws being disposed in generally radial planes. The jaws define three angularly spaced, axially and radially opening notches 23 around the periphery of each sleeve, and herein the jaws of each sleeve project into the notches of the other sleeve and thus interfit with one another as shown in FIG. 1.

The notches 23 are of greater circumferential width than the sleeve jaws 20 thereby leaving space between the adjacent side walls 21 of the interfitting jaws for the reception of cushioning pads 24 formed on the spider 15. Herein, the spider is molded of relatively firm but resiliently compressible rubber and comprises a centrally disposed circular disk 25 (FIGS. 2 and 3) and a relatively wide ring 26 encircling the disk. The cushioning pads are rubber lugs molded integrally with and radiating outwardly from the ring and having end faces 27 coplanar with ends of the ring. The lugs 24 define a series of six angularly spaced notches 28 around the periphery of the spider with each notch being equal in circumferential width to one of the sleeve jaws 20. In the assembled coupling, the sleeve jaws project into the notches 28 formed in the spider while the spider lugs 24 are disposed in and substantially fill the spaces left between adjacent jaws. Thus, the lugged spider holds the metal coupling heads 13 and 14 in the condition shown in FIGS. 1 and 3 and transmits the driving torque from one head to the other, but is capable of yielding to accommodate the relative movement of the heads that occur in service use.

For optimum operation, it is desirable to have the end faces 22 of the jaws 20 on each sleeve 16 spaced axially a slight distance from the closed ends 30 of the notches 23 formed in the other sleeve thus defining small axially extending gaps 31 (FIG. 1) between the jaw end faces and the closed ends of the notches. Because of the existence of such gaps, the end faces of the jaws do not contact the metal of the opposing sleeve thereby avoiding endwise knocking of the jaws that otherwise would result in noisy operation and excessive wear. The axial gaps also enable the sleeves to shift relative to one another when the shafts 11 and 12 are misalined. Additionally, it is advantageous to provide a small amount of axial clearance, as indicated at 40 in FIGS. 1 and 3, between the end faces 27 of the spider lugs 24 and the closed ends 30 of the notches in the sleeves. Without such clearance, an excessive amount of end thrust would be exerted on the sleeves during rotation of the coupling. As the coupling rotates, the working faces 21 of sleeve jaws compress the rubber of the spider lugs 24 tangentially thereby causing the lugs to bulge and enlarge both radially and axially. When transmitted to the sleeves, such axial bulging of the lugs exerts end thrust on the heads 13 and 14 preventing their free floating and thus causing possible damage to the bearings supporting the shafts. By providing the clearance 40, sufficient space is left for the lugs to bulge without engaging the sleeves and exerting end thrust.

In accordance with the present invention, provision is made of small axially projecting spacers 42 which preferably but not necessarily are formed on the end faces 27 of the spider lugs 24 to establish the gaps 31 and the clearance 40 at optimum values automatically as an incident to coupling the sleeves 16 to the spider 15 thereby avoiding the need for manually determining the proper spacing. Moreover, the surface area of the spacers is small as compared with the end faces of the lugs so that endwise thrust produced by bulging of the lugs is absorbed by the spacers and only a very slight amount of thrust is transmitted to the sleeves. With this arrangement, rapid and simple coupling of the sleeves is possible without requiring discretion on the part of the installer who might otherwise improperly establish the spacing or fail to do so altogether and, at the same time, the amount of end thrust exerted on the heads 13 and 14 is kept small to avoid interference with the effective operation of the coupling.

In the embodiment shown in FIGS. 1 to 3, the spacers 42 are ribs molded integrally with each end face 27 of each lug 24 and formed with upper and lower surfaces concentrically curved about the axis of the spider ring 26. Preferably, the circumferential length of the ribs is equal to that of the lugs, and the ribs are located on the lugs with their lower curved surfaces lying on generally the same radius as the external periphery of the ring. The radial width of each rib is such that the area of the end face of the rib is approximately 80 percent less than the area of the end face 27 of the associated lug. It is desirable to locate the ribs near the root of the lugs since the compressive strain in each lug is smallest in the area of its shortest radius.

As shown most clearly in FIGS. 1 and 3, the ribs 42 engage the closed ends 30 of the notches 23 in the sleeves 16 and thereby maintain the clearance 40 between the end faces 27 of the spider lugs 24 and the closed ends of the notches. At the same time, the ribs establish the gaps 31 between the end faces 22 of the sleeve jaws 20 and the closed ends of the notches to avoid contact between these parts. The axial lengths of the ribs, the lugs and the jaws are chosen to provide the spacing necessary to enable optimum performance by a coupling of given size.

As as result of the ribs 42, the clearance 40 and the gaps 31 are automatically set properly when the sleeves 16 are brought together since the installer simply slides the sleeves toward each other and the spider 15 until the closed ends 30 of the sleeve notches 23 engage the ribs. Accordingly, the installer need not use gap gages nor make manual adjustments to determine and obtain the proper spacing. Even though the sleeves may be coupled in such a simple manner, the end thrust exerted on the sleeves during rotation of the coupling is not excessive since the portions of the lugs spaced radially outwardly from the ribs merely bulge and expand into the clearance 40 without contacting the closed ends of the notches, while the relatively small ribs absorb the remainder of the thrust and transmit only a very small amount to the sleeves.

Another form of spacers is shown in FIGS. 4 and 5 in which the ribs on the lugs 24 are replaced by small cylindrical protrusions or dots 42' projecting axially from the end surfaces 27 of the lugs and located just beyond the outer periphery of the ring 26. The dots are formed with flat end surfaces which engage the closed ends 30 of the sleeve notches 23 to maintain the desired spacing between the parts of the coupling. Instead of being cylindrical, the spacers may be frusto-conical in shape as indicated by the dots 42" in the modification shown in FIGS. 6 and 7. While the dots 42' and 42" have less surface area than the ribs 42 and thus will transmit less thrust, they may tend to wear more rapidly in certain installations.

As shown in FIGS. 8 to 10, the invention may be embodied in a modified form of coupling 50 in which two heads 51 and 52 are mounted on the adjacent end portions of shafts 11' and 12' and are connected by an intermediate sleeve or spool 53. In this instance, each head includes a hollow cylindrical sleeve or hub 54 having a center bore 55 receiving the associated shaft and being secured to the latter by a set screw 56. At their remote ends, the heads each are formed with four equally spaced jaws 57 integral with and projecting radially outwardly from the hub and defining a series of angularly spaced axially and radially opening notches. The intermediate spool 53 is a tubular metal member telescoped loosely over the hubs and formed at each end with four axially projecting and angularly spaced jaws 58. These jaws fit into the notches formed between the hub jaws 57 but are of less circumferential and radial width than the notches so as to leave spaces between the adjacent sides of interfitting jaws and also between the inside surfaces of the spool jaws and the outside surfaces of the hubs. In a broad sense, one of the heads 51, 52 may be considered as one coupling sleeve and the spool 53 may be considered as a second coupling sleeve.

Herein, the cushioning pads are lugs 60 of firm rubber arranged in pairs filling the spaces on both sides of each hub jaw 57 and integrally connected by webs 61 (FIGS. 9 and 10) of the same material each extending across the inner end face of the hub jaw and between adjacent spool jaws 58. In addition each lug is joined to the adjacent lug by an arcuate web 62 (FIGS. 8 and 10) extending under the spool jaw and filling the space between the lower surface of this jaw and the outer peripheral surface of the hub. Accordingly, the lugs 60 and the two sets of webs 61 and 62 form a one-piece rubber spider holding each head 51, 52 to the adjacent end of the spool 53 and capable of yielding to accommodate the various relative movements occurring during service use.

In this coupling, the spacers are short cylindrical dots or protrusions 65 (FIG. 10) projecting axially from the outer surface of each web 61 toward the inner end face of the respective hub jaw 57 fitting between the spider lugs 60. Thus, when each head 51, 52 is moved toward the spool 53 into coupling relationship, the dots 65 engage the inner end faces of the hub jaws to limit further movement of the head and to establish a small gap 66 (FIG. 9) between the hub jaws and the webs 61. As a result, clearance is automatically provided to accommodate relative tilting of the heads and the spool, and yet excessive end thrust is avoided because the major portion of each web simply will bulge into the gap during rotation of the coupling without engaging and forcing the hub jaw outwardly in an axial direction.

From the foregoing, it will be apparent that the new and improved couplings of the present invention not only are designed for rapid and easy installation but also are constructed with a built-in safeguard precluding their being inadvertently installed without the establishment of proper clearances. Moreover, these advantages are achieved while maintaining the end thrust exerted on the sleeves sufficiently small as to not interfere with effective operation of the couplings.

I claim as my invention:

1. A laterally and torsionally flexible coupling for drivingly connecting two shafts disposed in end-to-end relation, said coupling comprising a pair of cylindrical hubs adapted to be telescoped onto and coupled to the adjacent end portions of said shafts, a hollow tubular coupling spool telescoped loosely over and surrounding said hubs and having ends overlying the respective hubs, a series of angularly spaced axially projecting jaws on each end of said spool defining an annular series of axially and radially opening notches around each of said hubs, a plurality of angularly spaced jaws on each of said hubs projecting radially outwardly therefrom into the spool notches overlying the hub and interfitting with the spool jaws defining said notches, said hub jaws being sized to leave spaces between the sides of interfitting jaws, resiliently flexible cushioning elements disposed in and filling said spaces between said jaws to transmit torque between said hubs and said spool, resiliently flexible webs connecting said cushioning elements between each hub jaw and extending across the closed ends of the notches in said spool, and resiliently compressible spacers projecting axially from said webs and engaging the adjacent ends of the hub jaws to maintain the same in axially spaced relation with the webs.

2. A coupling as defined in claim 1 further including second resiliently flexible webs connecting said cushioning elements under said spool jaws to hold said hubs in vertically spaced relation with the spool jaws.

3. A laterally and torsionally flexible coupling for drivingly connecting two shafts disposed in end-to-end relation, said coupling comprising a pair of cylindrical sleeves receiving the adjacent end portions of the shafts to be coupled, the adjacent ends of said sleeves having a plurality of angularly spaced sleeve jaws defining an annular series of angularly spaced notches, the jaws on one of said sleeves projecting radially therefrom and the jaws on the other sleeve projecting axially therefrom, the jaws of each sleeve projecting into the notches and interfitting with the jaws of the other sleeve and being sized to leave spaces between the sides of the interfitting jaws, a circular spider of resiliently compressible material disposed between said sleeves and having a series of angularly spaced radially projecting spider lugs defining a plurality of angularly spaced notches around said spider, said sleeve jaws fitting within said notches in said spider and said spider lugs disposed in and filling the spaces between said interfitting sleeve jaws to transmit torque between said sleeves, and a series of spacers projecting axially between axially facing surfaces of said spider and axially facing surfaces of one of said sleeves to hold said surfaces of said spider in axially spaced relation with said surfaces of said one sleeve.

References Cited

UNITED STATES PATENTS

| 2,003,848 | 6/1935 | Grundy | 64—14 |
| 2,620,640 | 12/1952 | Bales | 64—14 |
| 2,706,897 | 4/1955 | Holoye | 64—14 |
| 2,891,395 | 6/1959 | Chater | 64—14 |

FOREIGN PATENTS

| 691,638 | 5/1953 | Great Britain. |
| 771,505 | 3/1957 | Great Britain. |

HALL C. COE, *Primary Examiner.*